US012025233B2

(12) United States Patent
Yajima et al.

(10) Patent No.: US 12,025,233 B2
(45) Date of Patent: Jul. 2, 2024

(54) RELIEF VALVE AND COOLING CIRCUIT USING SAME

(71) Applicant: NIPPON THERMOSTAT CO., LTD., Kiyose (JP)

(72) Inventors: Noriyasu Yajima, Kiyose (JP); Takatoshi Furuya, Kiyose (JP); Syota Morizumi, Kiyose (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 17/925,200

(22) PCT Filed: Apr. 20, 2021

(86) PCT No.: PCT/JP2021/016002
§ 371 (c)(1),
(2) Date: Nov. 14, 2022

(87) PCT Pub. No.: WO2022/004099
PCT Pub. Date: Jan. 6, 2022

(65) Prior Publication Data
US 2023/0194009 A1  Jun. 22, 2023

(30) Foreign Application Priority Data
Jul. 2, 2020  (JP) .................................. 2020-115169

(51) Int. Cl.
*F16K 17/38* (2006.01)
*F16K 17/04* (2006.01)
(Continued)

(52) U.S. Cl.
CPC .......... *F16K 17/04* (2013.01); *F16K 27/0209* (2013.01); *F28F 27/02* (2013.01); *F28F 2250/06* (2013.01); *F28F 2265/12* (2013.01)

(58) Field of Classification Search
CPC ...... F16K 17/04; F16K 27/0209; F28F 27/02; F28F 2250/06; F28F 2265/12
See application file for complete search history.

(56) References Cited

U.S. PATENT DOCUMENTS 1,871,535 A    8/1932  Lattner
4,516,601 A *  5/1985  Chanal .................... E21D 23/16
                                                137/906

(Continued)

FOREIGN PATENT DOCUMENTS

CN    109424484 A    3/2019
EP    1 815 205 B1   8/2007
(Continued)

OTHER PUBLICATIONS

The extended European search report dated Mar. 27, 2024 issued in the corresponding EP Patent Application No. 21834048.7.

*Primary Examiner* — P. Macade Nichols
(74) *Attorney, Agent, or Firm* — Carrier, Shende & Associated P.C.; Joseph P. Carrier; Jeffrey T. Gedeon

(57) ABSTRACT

A relief valve 1 includes: a housing 6 connected to a supply-side connection pipe 4a and a discharge-side connection pipe 5a and has an inflow port 61c and an outflow port 62c; a valve seat (an opening rim 61a) provided in the housing 6; a main valve body 7 which is placed in the housing 6, and capable of cutting off communication between the inflow port 61c and the outflow port 62c in the housing 6 by being seated on the valve seat (the opening rim 61a); and a biasing member 8 that biases the main valve body 7 toward the valve seat (the opening rim 61a), wherein the inflow port 61c is provided in the housing 6 such that the inflow port 61c is decentered with respect to a central axis line of the main valve body 7 in a direction in which a supply pipe 4 extends.

2 Claims, 6 Drawing Sheets

(51) Int. Cl.
   *F16K 27/02*      (2006.01)
   *F28F 27/02*      (2006.01)

(56)           References Cited

U.S. PATENT DOCUMENTS

| | | |
|---|---|---|
| 8,020,782 B2 | 9/2011 | Moser et al. |
| 2015/0277453 A1 | 10/2015 | Yajima |
| 2020/0347946 A1* | 11/2020 | Liebhart ............. F04B 53/1032 |

FOREIGN PATENT DOCUMENTS

| | | |
|---|---|---|
| EP | 1 832 822 B1 | 9/2007 |
| EP | 2 452 108 B1 | 5/2012 |
| EP | 2 808 211 A1 | 12/2014 |
| JP | S55-123622 U | 9/1980 |
| JP | H07-25500 Y2 | 6/1995 |
| JP | H09-89313 A | 4/1997 |
| JP | 3184072 B2 | 7/2001 |
| JP | 2007-291927 A | 11/2007 |
| JP | 5149624 B2 | 2/2013 |
| JP | 2014-145468 A | 8/2014 |
| JP | 2019-039333 A | 3/2019 |
| WO | 2007/040169 A1 | 4/2007 |

* cited by examiner

RELIEF VALVE AND COOLING CIRCUIT USING SAME

TECHNICAL FIELD

The present invention relates to a relief valve and a cooling circuit using the same.

BACKGROUND ART

There has conventionally been known a cooling circuit adapted to cool an object to be cooled by a cooling medium (refer to, for example, Japanese Utility Model Laid-Open No. 55-123622). The cooling circuit of Japanese Utility Model Laid-Open No. 55-123622 is provided with a relief valve that releases the pressure of a cooling medium supplied to a heat exchange unit so as to protect the heat exchange unit when the pressure is high.

SUMMARY OF INVENTION

Technical Problem

In the case where a supply-side connection pipe connected to a supply pipe, through which a cooling medium is supplied to a heat exchange unit, and a discharge-side connection pipe connected to a discharge pipe, through which the cooling medium is discharged, are placed alongside each other, and a relief valve is provided at a portion where the supply-side connection pipe and the discharge-side connection pipe are bypass-connected so as to relieve the pressure of a cooling medium in the supply pipe into the discharge pipe through the relief valve when the pressure is high, the cooling medium flows in such a manner as to make a U-turn back into the discharge-side connection pipe from the middle of the supply-side connection pipe in some cases. In such a case, it may become difficult to secure a flow rate passing through the relief valve.

This happens because of the following reason. When the entrance for the cooling medium in the relief valve is defined as the inflow port and the exit for the cooling medium is defined as the outflow port, if the relief valve is provided such that the cooling medium makes a U-turn as described above, then the cooling medium flows, being biased toward the outer side of the U-turn portion, i.e., toward the side closer to the heat exchange unit, despite the inflow port and the main valve body of the relief valve being concentrically placed, and the flow velocity of a part of the cooling medium in the vicinity of the outflow port in the discharge-side connection pipe becomes higher, thus causing that particular part to have a higher flow path resistance. Further, although the flow rate can be increased by increasing the size of the relief valve, a sufficient mounting space cannot be secured due to reasons such as the positional relationship with other devices, and there is a limit to increasing the size of the relief valve.

In view of the aspects described above, an object of the present invention is to provide a relief valve that can secure a flow rate without increasing the size of the relief valve, and a cooling circuit using the same.

Solution to Problem

To fulfill the aforementioned object, a relief valve in accordance with the present invention includes:
 a supply-side connection pipe to be connected to a supply pipe;
 a discharge-side connection pipe which is placed alongside the supply-side connection pipe and which is to be connected to a discharge pipe;
 a housing which is connected to the supply-side connection pipe and the discharge-side connection pipe and which has an inflow port that opens to the supply-side connection pipe and an outflow port that opens to the discharge-side connection pipe;
 a valve seat provided in the housing;
 a main valve body which is placed in the housing, cuts off communication between the inflow port and the outflow port by being seated on the valve seat, and reestablishes communication between the inflow port and the outflow port by moving away from the valve seat; and
 a biasing member that biases the main valve body in a direction for seating the main valve body on the valve seat,
 wherein the inflow port is provided in the housing such that the inflow port is decentered with respect to a central axis line of the main valve body in a direction in which the supply-side connection pipe extends.

According to the present invention, without increasing the size, the supply-side connection pipe, which supplies a cooling medium to a heat exchange unit, and the discharge-side connection pipe, through which the cooling medium is discharged, are placed alongside each other, and the relief valve is provided at a portion where the supply-side connection pipe and the discharge-side connection pipe are bypass-connected so as to relieve the pressure of the cooling medium, which is supplied to the heat exchange unit, into the discharge-side connection pipe through the relief valve from the middle of the supply-side connection pipe when the pressure of the cooling medium is high, thus making it possible to secure a flow rate without increasing the size of the relief valve even if the cooling medium flows in such a manner as to make a U-turn.

This is because, when the inflow port is decentered away from the heat exchange unit with respect to the central axis line of the main valve body, the cooling medium flows relatively evenly around the main valve body placed in the portion where the cooling medium makes a U-turn, so that it is possible to prevent the flow path resistance from increasing in the discharge-side connection pipe.

This is also because, when the inflow port is decentered toward the heat exchange unit, the cooling medium more easily passes on a side closer to the heat exchange unit in the relief valve, i.e., a side on which the cooling medium actively flows.

[2] Further, in the present invention, the outflow port is preferably provided in the housing such that the outflow port is decentered in a direction in which the discharge-side connection pipe extends.

According to the present invention, the flow rate of the cooling medium passing through the relief valve is easily secured.

[3] Further, a cooling circuit in accordance with the present invention includes:
 the relief valve,
 wherein the supply-side connection pipe is adapted to guide a cooling medium to a heat exchange unit, and
 the discharge-side connection pipe is adapted to discharge the cooling medium.

According to the present invention, when the pressure of a cooling medium supplied to the heat exchange unit is high, the pressure is released into the discharge-side connection pipe from the middle of the supply-side connection pipe through the relief valve, and a flow rate can be secured without increasing the size of the relief valve even when the cooling medium flows in such a manner as to make a U-turn.

DESCRIPTION OF EMBODIMENTS

First Embodiment

Referring to FIG. 1 to FIG. 4, a first embodiment of a relief valve of the present invention will be described.

Figure 1:
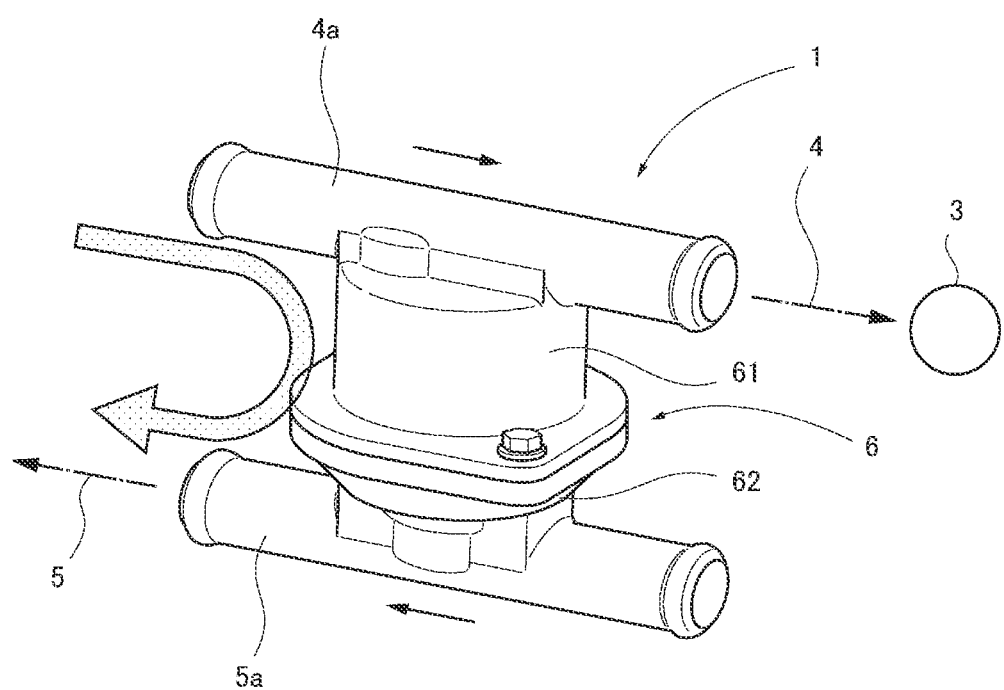
FIG. 1 is a perspective view illustrating a relief valve of a first embodiment of the present invention.

Referring to FIG. 1, a cooling circuit provided with a relief valve 1 of the first embodiment is adapted to perform heat exchange by circulating a cooling medium such as cooling water warmed by cooling an internal combustion engine to a heat exchange unit such as a radiator, a heater core, an AT (automatic transmission)/CVT (continuously variable transmission), an EGR (exhaust gas recirculation), and includes a supply pipe 4, through which the cooling medium is supplied to a heat exchange unit 3, and the relief valve 1 that relieves the pressure in the supply pipe 4 into a discharge pipe 5 when the pressure in the supply pipe 4 reaches a predetermined value or more.

The relief valve 1 includes a supply-side connection pipe 4a to be connected to the supply pipe 4, a discharge-side connection pipe 5a to be connected to the discharge pipe 5, and a housing 6 which connects the supply-side connection pipe 4a and the discharge-side connection pipe 5a. The discharge-side connection pipe 5a is placed in parallel or substantially parallel to the supply-side connection pipe 4a. The housing 6 is configured by overlapping a cylindrical first half body 61 connected to the supply-side connection pipe 4a and a semispherical second half body 62 connected to the discharge-side connection pipe 5a.

Figure 2:
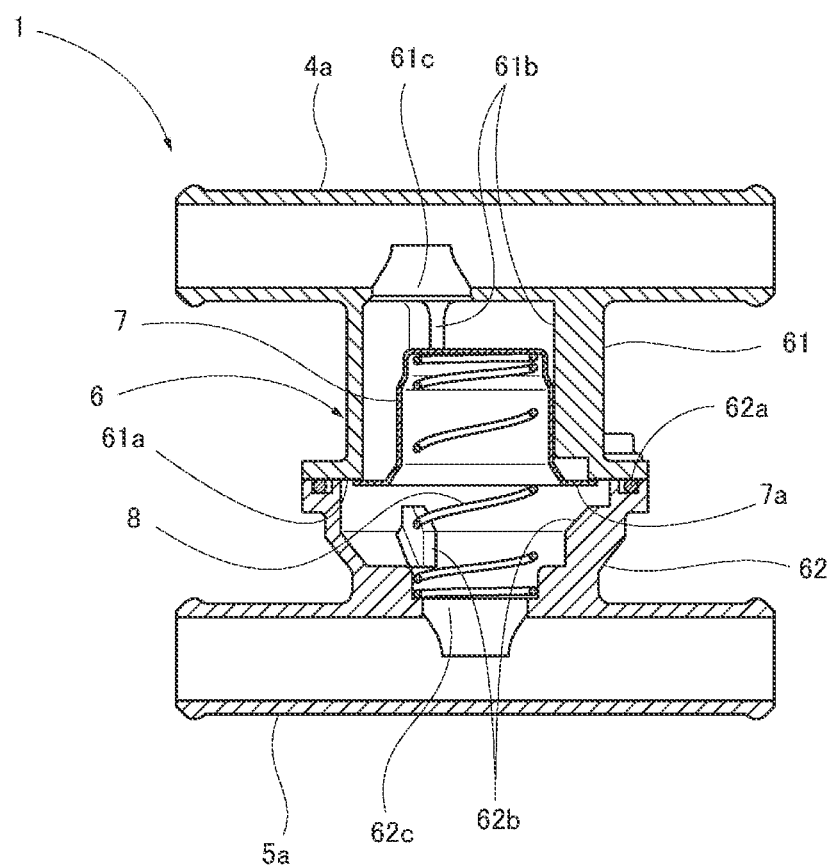
FIG. 2 is an explanatory diagram illustrating a section of the relief valve of the first embodiment.

Referring to the sectional view of FIG. 2, the relief valve 1 includes a bottomed cylindrical main valve body 7 housed in the first half body 61, and a biasing member 8 which is composed of a coil spring and housed in the second half body 62 and which biases the main valve body 7 toward the first half body 61.

The main valve body 7 is placed with the opening thereof facing the second half body 62 and placed so as to be movable in the housing 6 along the direction of the central axis line of the main valve body 7. The opening rim of the main valve body 7 adjacent to the second half body 62 is provided with a protruding section 7a, which protrudes outward in the radial direction. When the protruding section 7a comes in contact with an opening rim 61a of the first half body 61 adjacent to the second half body 62, the communication between an inflow port 61c and an outflow port 62c, which will be described later, is cut off, and the movement of the main valve body 7 toward the first half body 61 is restricted. Conversely, when the protruding section 7a moves away from the opening rim 61a, the communication between the inflow port 61c and the outflow port 62c is reestablished, enabling the cooling medium to flow in the housing 6. In other words, the opening rim 61a of the first half body 61 functions as the valve seat on which the main valve body 7 is seated and from which the main valve body 7 moves away.

Figure 3:
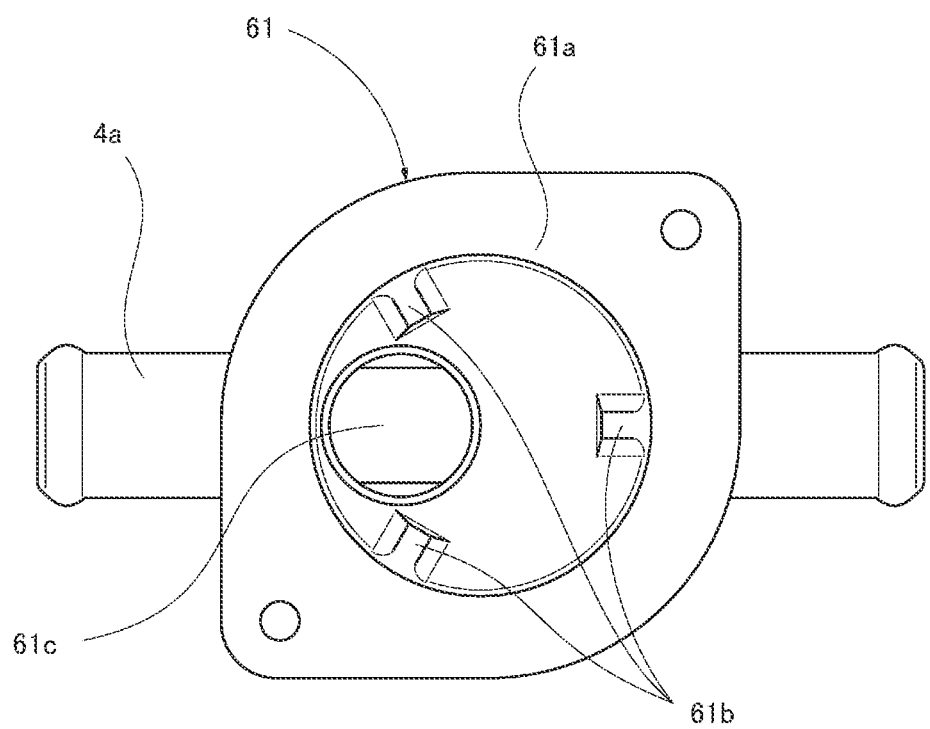
FIG. 3 is an explanatory diagram illustrating a first half body of the relief valve of the first embodiment viewed from a second half body side.

FIG. 3 is a diagram illustrating the first half body 61 viewed from the second half body 62 side. Referring to FIG. 2 and FIG. 3, three ribs 61b extending along the direction in which the main valve body 7 is pressed by the biasing member 8 are placed on the inner peripheral surface of the first half body 61 at equal intervals in the circumferential direction. The ribs 61b maintain the central position of the main valve body 7 in the housing 6 while allowing the main valve body 7 to move in the biasing direction of the biasing member 8. Further, the first half body 61 is provided with the inflow port 61c communicating with the supply pipe 4. The inflow port 61c is provided, being decentered in the direction in which the supply pipe 4 extends and in the direction away from the heat exchange unit 3 with respect to the central axis line of the main valve body 7.

Figure 4:
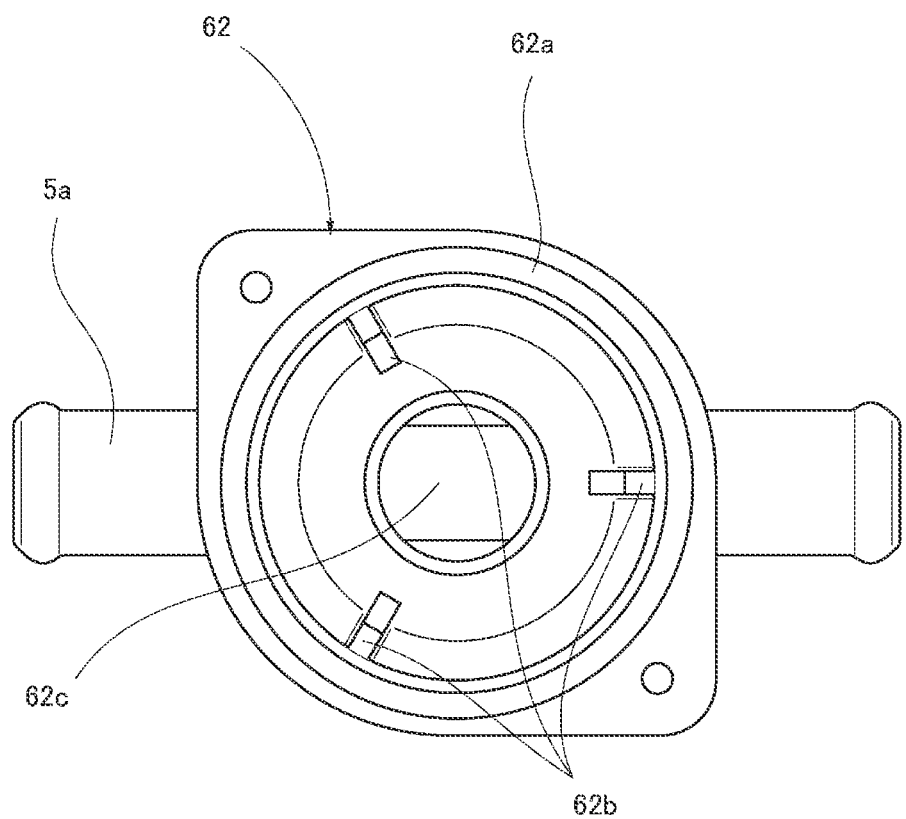
FIG. 4 is an explanatory diagram illustrating the second half body of the relief valve of the first embodiment from a first half body side.

FIG. 4 is a diagram illustrating the second half body 62 viewed from the first half body 61 side. Referring to FIG. 2 and FIG. 4, the opening rim of the second half body 62 overlapped with the first half body 61 is provided with a circular groove in which an O-ring 62a for liquid-tightly sealing the gap between the first half body 61 and the second half body 62 is fitted.

Here, when the pressure of the cooling medium in the supply-side connection pipe 4a increases by a predetermined value or more, the pressure of the cooling medium causes the main valve body 7 to move toward the second half body 62 against the biasing force of the biasing member 8.

Three ribs 62b, which restrict the amount of movement of the main valve body 7 toward the second half body 62, are provided on the inner peripheral surface of the second half body 62 at equal intervals in the circumferential direction of the second half body 62 so as to properly secure the gap between the main valve body 7 and the second half body 62. Further, the second half body 62 is provided with the outflow port 62c communicating with the discharge pipe 5. The outflow port 62c is provided concentrically with the central axis line of the main valve body 7.

According to the relief valve 1 of the first embodiment and the cooling circuit using the same, the flow rate of a cooling medium can be secured without increasing the size of the relief valve 1.

This is because the inflow port 61c is decentered in the direction in which the supply-side connection pipe 4a extends and in the direction away from the heat exchange unit 3 with respect to the central axis line of the main valve body 7, so that a cooling medium flows relatively evenly with respect to the main valve body 7, thus making it possible to prevent the flow path resistance on the outflow port 62c side from increasing. In addition, the relatively even flow of the cooling medium with respect to the main valve body 7 makes it possible to restrain the main valve body 7 from tilting.

Second Embodiment

Figure 5:
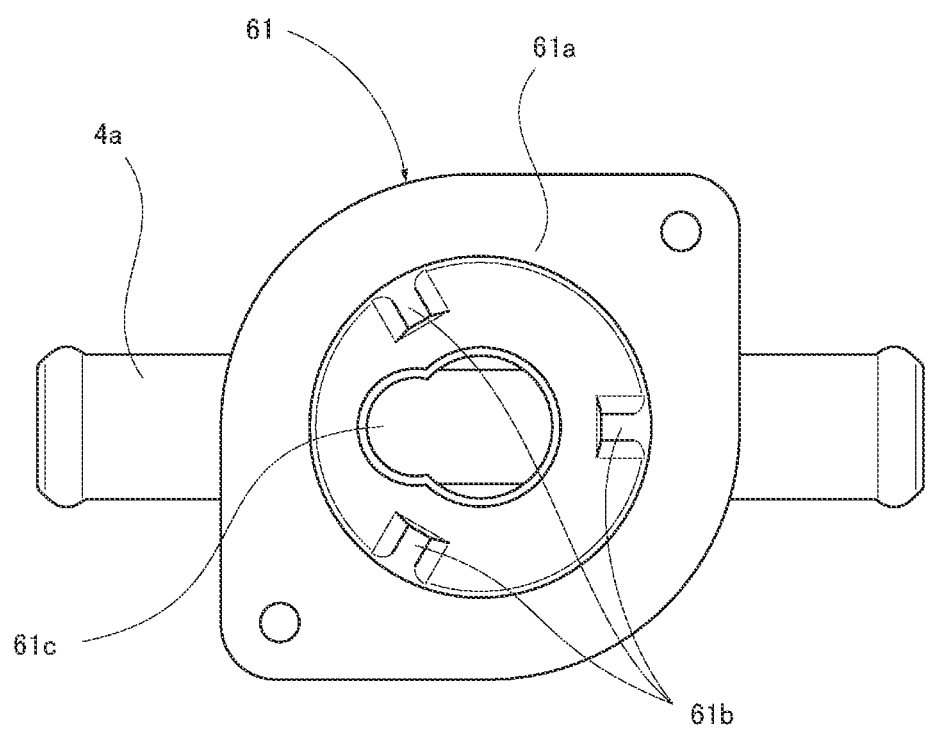
FIG. 5 is an explanatory diagram illustrating a first half body of a relief valve of a second embodiment of the present invention viewed from a second half body side.

FIG. 5 is a diagram illustrating a first half body 61 of a relief valve 1 of a second embodiment of the present invention viewed from a second half body 62 side. The relief valve 1 of the second embodiment has entirely the same configuration as that of the first embodiment except that an inflow port 61*c* provided in the first half body 61 has a snowman shape with the head thereof directed away from a heat exchange unit 3.

As is obvious from the inflow port 61*c* of the second embodiment, the decentering of the inflow port 61*c* in accordance with the present invention in the extending direction of the supply pipe 4 with respect to the central axis line of the main valve body 7 means that the center point of the opening area of the inflow port 61*c* is displaced in the extending direction of the supply pipe 4 with respect to the central axis line of the main valve body 7. As in the first embodiment, the relief valve 1 of the second embodiment also makes it possible to secure the flow rate of a cooling medium in the relief valve 1 without increasing the size of the relief valve 1.

Third Embodiment

Figure 6:
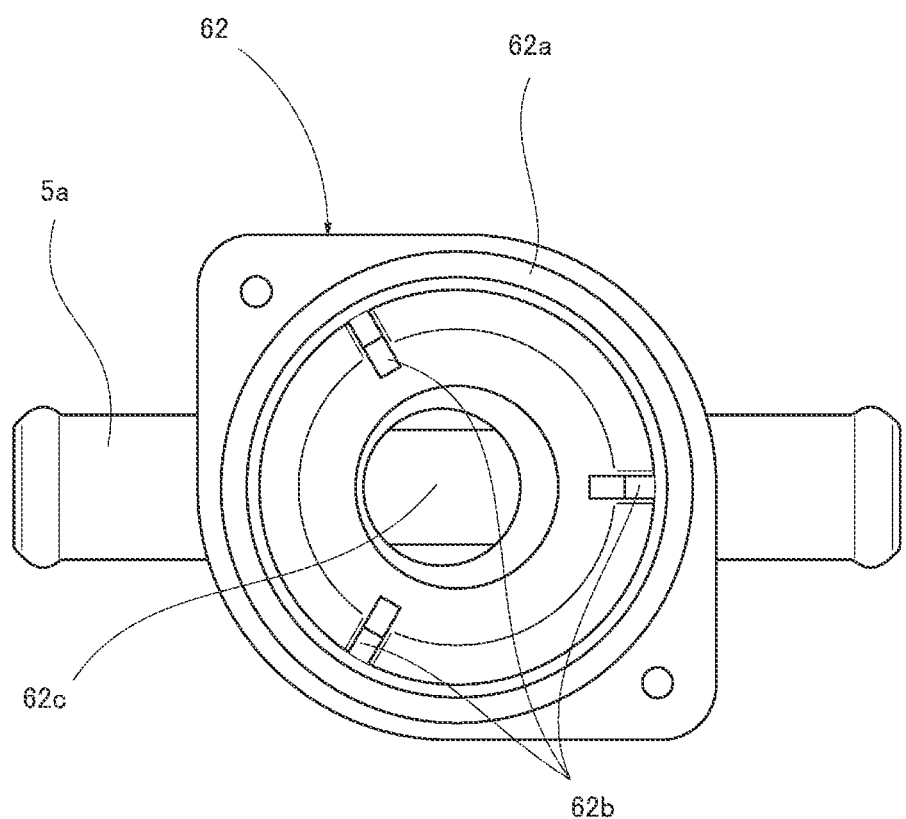
FIG. 6 is an explanatory diagram illustrating a second half body of a relief valve of a third embodiment of the present invention viewed from a first half body side.

FIG. 6 is a diagram illustrating a second half body 62 of a relief valve 1 of a third embodiment of the present invention viewed from a first half body 61 side. The relief valve 1 of the third embodiment has entirely the same configuration as that of the first embodiment except that an outflow port 62*c* provided in the second half body 62 is provided, being decentered in the extending direction of a discharge pipe 5 with respect to the central axis line of a main valve body 7, more specifically, the outflow port 62*c* is provided, being decentered in the direction away from a heat exchange unit 3, as with an inflow port 61*c*. According to the relief valve 1 of the third embodiment, the flow rate of a cooling medium in the relief valve 1 can be further properly secured.

Other Embodiments

In the first embodiment, the description has been given of the inflow port 61*c* and the outflow port 62*c* having the completely round shapes; however, the shapes of the inflow port 61*c* and the outflow port 62*c* are not limited thereto, and may be, for example, elliptical shapes.

Further, the decentering direction of the inflow port 61*c* may be any direction in which the supply-side connection pipe 4*a* extends, and may be decentered, for example, in a direction approaching the heat exchange unit 3. Such a configuration makes it possible to obtain the operation and effect of the present invention whereby a cooling medium easily flows on the heat exchange unit 3 side in the relief valve 1, and the flow rate of the cooling medium in the relief valve 1 can be secured, as in the first embodiment.

Further, in the case where the inflow port 61*c* is decentered toward the heat exchange unit 3, the flow rate of the cooling medium can be further properly secured regardless of whether the outflow port 62*c* is decentered in the direction away from the heat exchange unit 3 or in the direction approaching the heat exchange unit 3 as long as the direction is the extending direction of the discharge-side connection pipe 5*a*.

DESCRIPTION OF REFERENCE NUMERALS 1 relief valve
3 heat exchange unit
4 supply pipe
4*a* supply-side connection pipe
5 discharge pipe
5*a* discharge-side connection pipe
6 housing
61 first half body
61*a* opening rim (valve seat)
61*b* rib
61*c* inflow port
62 second half body
62*a* O-ring
62*b* rib
62*c* outflow port
7 main valve body
7*a* protruding section
8 biasing member

The invention claimed is:

1. A relief valve comprising:
a supply-side connection pipe to be connected to a supply pipe;
a discharge-side connection pipe which is placed alongside the supply-side connection pipe and which is to be connected to a discharge pipe;
a housing which is connected to the supply-side connection pipe and the discharge-side connection pipe and which has an inflow port that opens to the supply-side connection pipe and an outflow port that opens to the discharge-side connection pipe;
a valve seat provided in the housing;
a main valve body which is placed in the housing, cuts off communication between the inflow port and the outflow port by being seated on the valve seat, and reestablishes communication between the inflow port and the outflow port by moving away from the valve seat; and
a biasing member that biases the main valve body in a direction for seating the main valve body on the valve seat,
wherein the inflow port is provided in the housing such that the inflow port is decentered with respect to a central axis line of the main valve body in a direction in which the supply-side connection pipe extends,
the supply-side connection pipe is adapted to guide a cooling medium to a heat exchange unit, and
the discharge-side connection pipe is adapted to discharge the cooling medium.

2. The relief valve according to claim 1,
wherein the outflow port is provided in the housing such that the outflow port is decentered in a direction in which the discharge-side connection pipe extends.

* * * * *